(12) United States Patent
Seewald-Raider

(10) Patent No.: US 11,046,566 B2
(45) Date of Patent: Jun. 29, 2021

(54) CONTAINER TREATMENT MACHINE AND METHOD FOR OPERATING A CONTAINER TREATMENT MACHINE

(71) Applicant: KHS GmbH, Dortmund (DE)

(72) Inventor: Alex Seewald-Raider, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/617,833

(22) PCT Filed: May 30, 2018

(86) PCT No.: PCT/EP2018/064206
§ 371 (c)(1),
(2) Date: Nov. 27, 2019

(87) PCT Pub. No.: WO2018/220026
PCT Pub. Date: Dec. 6, 2018

(65) Prior Publication Data
US 2020/0148525 A1     May 14, 2020

(30) Foreign Application Priority Data
Jun. 2, 2017   (DE) ..................... 10 2017 112 202.8

(51) Int. Cl.
*B67C 7/00*   (2006.01)
*B65G 29/00*  (2006.01)
*B65G 47/84*  (2006.01)

(52) U.S. Cl.
CPC .............. *B67C 7/004* (2013.01); *B65G 29/00* (2013.01); *B65G 47/846* (2013.01)

(58) Field of Classification Search
CPC .... B65G 47/84; B65G 47/846; B65G 47/847; B65G 47/848; B65G 29/00; B67C 7/004; B67C 7/0046; B67C 7/0053
See application file for complete search history.

(56) References Cited

U.S. PATENT DOCUMENTS 2,827,998 A  *  3/1958  Breeback ............... B65G 47/71
                                                   198/441
4,997,330 A  *  3/1991  Blezard ................ B65G 47/847
                                                   414/21
5,800,112 A  *  9/1998  Stafford ................. B65G 69/16
                                                   193/25 C (Continued)

FOREIGN PATENT DOCUMENTS

DE    202005002469    6/2005
DE    202005002470    12/2005

(Continued)

*Primary Examiner* — William R Harp
(74) *Attorney, Agent, or Firm* — Occhiuti & Rohlicek LLP

(57) ABSTRACT

A container-treatment machine comprises first and second motors, a bearing device, a ring gear, and a gyroscope that rotates about a rotation axis and receives containers. The motors are arranged in corresponding first and second columns and couple to corresponding first and second pinions. They are fixed relative to the bearing device. The ring gear is mounted on the bearing device and includes a circular tooth arrangement that meshes with the pinions. The pinions are arranged at a distance from one another along a circumferential direction of the tooth arrangement.

22 Claims, 5 Drawing Sheets

(56) References Cited

U.S. PATENT DOCUMENTS

| | | | | |
|---|---|---|---|---|
| 7,731,022 | B2* | 6/2010 | Zepf | B65G 47/846 |
| | | | | 198/860.1 |
| 7,743,907 | B2 | 6/2010 | Weinbrenner | |
| 7,997,048 | B2* | 8/2011 | Bernhard | B67C 3/02 |
| | | | | 53/253 |
| 8,047,357 | B2* | 11/2011 | Braun | B65G 29/00 |
| | | | | 198/860.1 |
| 9,145,259 | B2* | 9/2015 | Tassy, Sr. | B65G 23/44 |
| 9,181,043 | B1* | 11/2015 | Goudy | B65G 29/00 |
| 9,567,165 | B2* | 2/2017 | Clusserath | B65G 47/847 |

FOREIGN PATENT DOCUMENTS

| | | |
|---|---|---|
| DE | 102008001285 | 10/2009 |
| DE | 102012000881 | 6/2013 |
| DE | 102013204461 | 9/2014 |
| EP | 1714939 | 10/2006 |
| EP | 2093168 | 12/2008 |
| EP | 3034421 | 6/2016 |
| GB | 1188888 | 4/1970 |

* cited by examiner

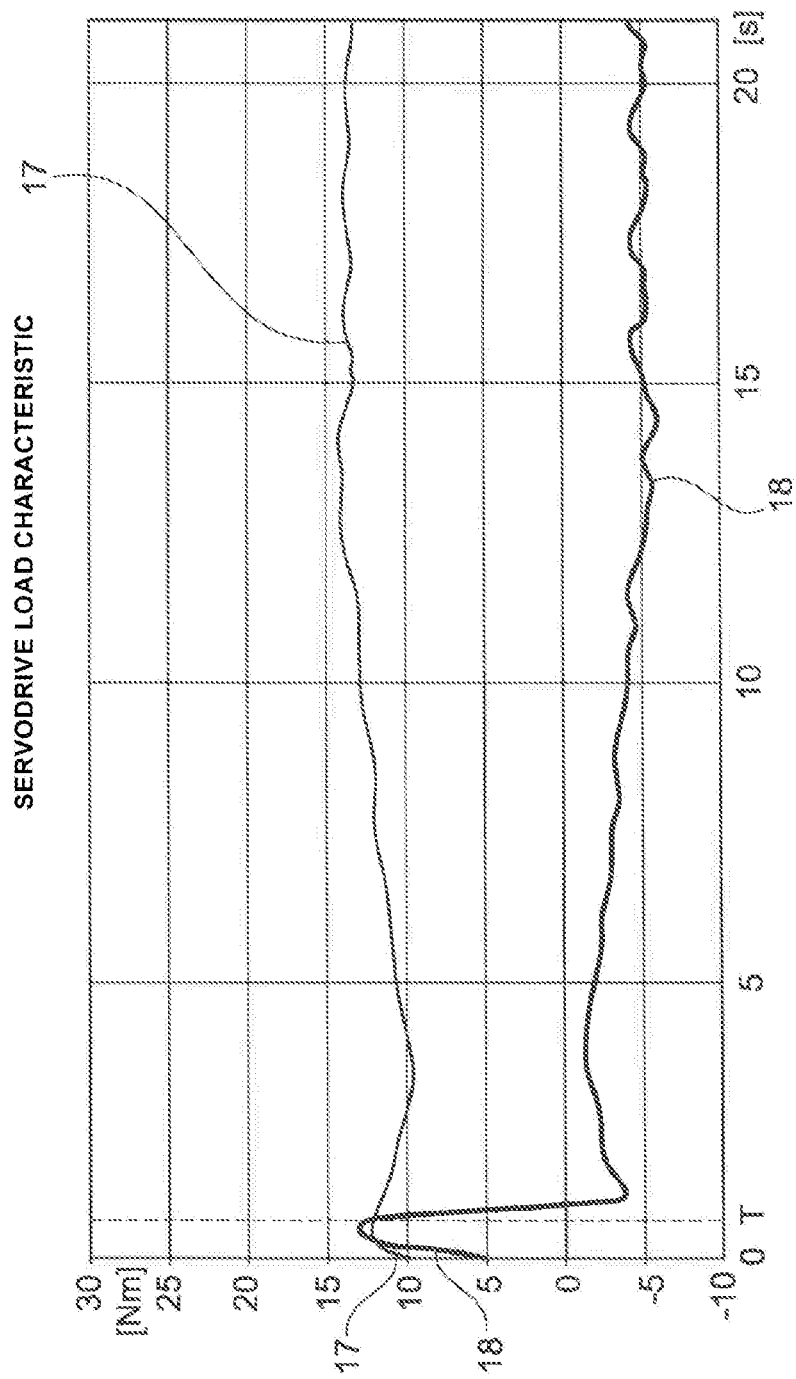

CONTAINER TREATMENT MACHINE AND METHOD FOR OPERATING A CONTAINER TREATMENT MACHINE

RELATED APPLICATIONS

This is the national stage of international application PCT/EP2018/064206, filed on May 30, 2018, which claims the benefit of the Jun. 2, 2017 priority date of German application DE 10-2017-112-202.8, the contents of which are herein incorporated by reference.

FIELD OF INVENTION

The present invention relates to a container-treatment machine and in particular to controlled rotation of a gyroscope on which containers to be treated are held.

BACKGROUND

Container treatment machines that are used for filling, cleaning, and closing containers, such as PET bottles, generally include a rotating section that must be made to rotate with some angular velocity. This rotating section is large and therefore has a large moment of inertia.

To regulate the angular velocity, it is necessary to have a motor that provides torque needed to accelerate or decelerate. Because the gyroscope is so massive, this motor must be able to output considerable amounts of torque in order to regulate its rotation. Such a motor must therefore be able to accommodate significant fluctuations in load over short periods of time.

During operation, these fluctuations induce current in the motor's windings. This leads to considerable ohmic heating.

The motor must therefore sustain both the mechanical stresses and the excessive heating. As a result, the motor is typically over-dimensioned.

SUMMARY

In one aspect, the invention features two pinions coupled to corresponding motors. The pinions mesh with teeth on a gyroscope's ring gear.

An alternative embodiment features an intermediate toothed belt that provides a connection between a motor or pinion on one side and a ring gear on the other.

In either case, the pinions interact with the ring gear at different points on the gear. These points are separated along the circumferential direction of the ring gear. This configuration results in the possibility of using motors that do not have to be over-dimensioned to an extent similar to that in the prior art. It also makes possible the use of motors that have a smaller drive output. In some cases, this configuration makes it possible to halve the motor's size and its drive output.

Yet another advantage is that the container-treatment machine is operable with no play. Therefore, there is no longer a need to provide a low-play transmission. This reduces wear and damage to bearings.

A variety of motors can be used. The preferred motors are a servomotors. However, is also possible to use DC motors, synchronous motors, asynchronous motors, and torque motors.

As used herein, a servomotor is a motor that is either synchronous or asynchronous but that includes a sensor and a rotary pulse generator.

As used herein, a "torque motor" is a servomotor with many pole pairs, or windings. Increasing the number of pole pairs results in a larger and heavier drive.

One motor serves as a drive motor and the other serves as a brake motor. These motors need not be of the same type. Examples of suitable combinations include having a servomotor as the brake motor and a DC motor as the drive motor; having a servomotor as the brake motor and a synchronous motor or asynchronous motor as the drive motor; and having a servomotor as the brake motor and a torque motor as the drive motor. This latter combination is, however, somewhat more expensive than the others.

In principle, it is also possible to use a torque motor as the drive motor and another torque motor as the brake motor. However, this is rarely used because torque motors operate with low RPM and easily be individually regulated.

In some embodiments, the two pinions are diametrically opposed to each other. This optimizes the drive outputs of the motors.

In other embodiments, the ring gear is an outer ring gear.

In some embodiments, the toothed engagement with the first and second pinions is one that arises from straight-tooth slewing bearing connections. As a result, it is possible to achieve adequate coupling without the need for a high quality tooth arrangement.

In some embodiments, the first and second motors are arranged within corresponding first and second columns of a bearing device. This arrangement saves space.

Some embodiments feature a toothed belt that connects a pinion to the ring gear to transfer power therebetween.

Other embodiments feature a planetary gear arranged between a motor and its pinion.

Some embodiments rely on individual motors that cooperate as a group of motors. In some embodiments, three or four motors thus cooperate. These motors cooperate to set the ring gear into motion. Preferably, these motors are controlled or regulated independently of each other. These motors can likewise be accommodated within the foregoing columns.

Yet another advantage is that the two motors are both operated in drive mode until production speed is reached. This means that the production speed can be achieved quickly even though the motors are individually not as powerful as that used in the prior art to achieve rapid acceleration to production speed.

By dedicating one motor to braking and another to driving, it is possible to avoid having a single motor that constantly sustains reversals of polarity. This avoids excessive heat production and constant phase-change sequences.

Yet another advantage arises from the fact that, once production speed has been reached, the braking motor is operable in a generator mode and can thus recover energy that was applied by the drive motor. The braking motor thus carries out constant energy recovery. This reduces consumption of electrical energy.

Further details and advantages of the invention are explained in greater detail on the basis of an exemplary embodiment represented in the drawings.

BRIEF DESCRIPTION OF THE DRAWINGS

FIG. 5 shows load characteristics of both motors shown in the container-treatment machine of FIGS. 1-3.

DETAILED DESCRIPTION

Figure 1:
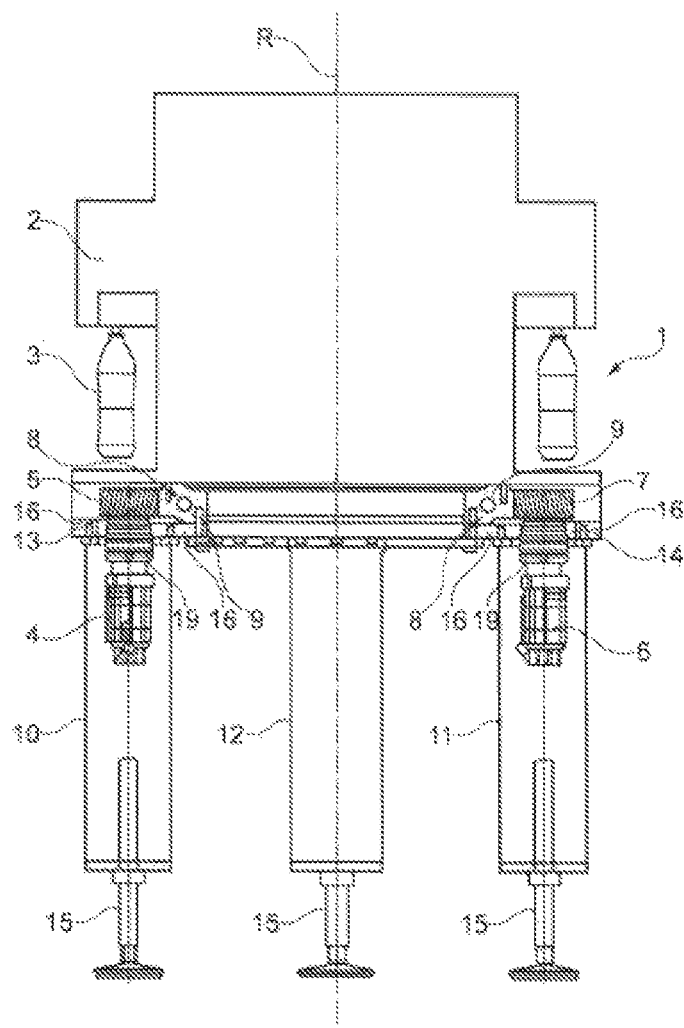
FIG. 1 is a sectional view of a container-treatment machine.

FIG. 1 shows a side view of a container-treatment machine 1 having first and second motors 4, 6. In a preferred embodiment, the first and second motors 4, 6 are servomotors. Each servomotor 4, 6 couples to a corresponding drive pinion 5, 7.

The container-treatment machine 1 includes a static lower part and a rotating upper part. The static lower part does not move relative to a standing surface. The upper part rotates about a rotation axis R relative to the standing surface.

The rotating upper part includes a gyroscope 2 that carries containers 3 to be treated. During operation, the gyroscope 2 rotates.

A circular ring gear 9 arranged at a lower end of the gyroscope 2 and concentric with the rotation axis R couples to the pinions 5, 7. The circular ring gear 9 securely connects to the gyroscope 2.

The ring gear 9 is mounted in a horizontally-extending bearing device 8 at an upper end region of the static lower device. The bearing device 8 includes a horizontally extending annular plate 16 having a central opening.

Beneath the bearing device 8 are columns 10, 11, 12. Only three columns 10, 11, 12 can be seen because of FIG. 1's perspective. A fourth column, which is hidden from view in FIG. 1, can be seen in FIG. 2.

Each column 10, 11, 12 has a height-adjustable foot 15 at its lower end. This permits the container-treatment machine 1 to be leveled on a surface upon which it stands.

Figure 2:
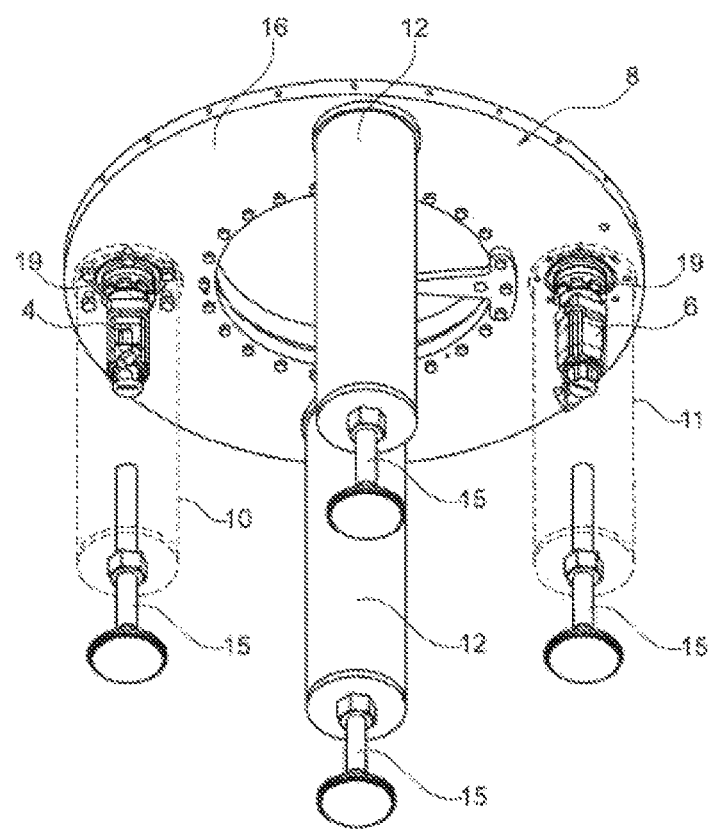
FIG. 2 is an oblique view of the container-treatment machine of FIG. 1 from below.

As shown in FIGS. 1 and 2, the first motor 4 is arranged vertically in the first column 10 and the second motor 6 is arranged vertically in the second column 11. This arrangement saves space. Both motors 4, 6 connect to the bearing 8 beneath the annular plate 16. The pinions 5, 7 are above the annular plate 16. First and second passages 13, 14 in the annular plate 16 permit coupling between the pinions 5, 7 and the motors 4, 6.

The ring gear 9 features a tooth arrangement. The pinions 5, 7 are coplanar with the ring gear 9 so that they mesh with teeth on the outer surface of the ring gear 9.

In an alternative embodiment, a third motor in a third column also couples to a third pinion, which also couples to the ring gear 9. This third motor operates in either drive mode or generator mode.

Figure 3:
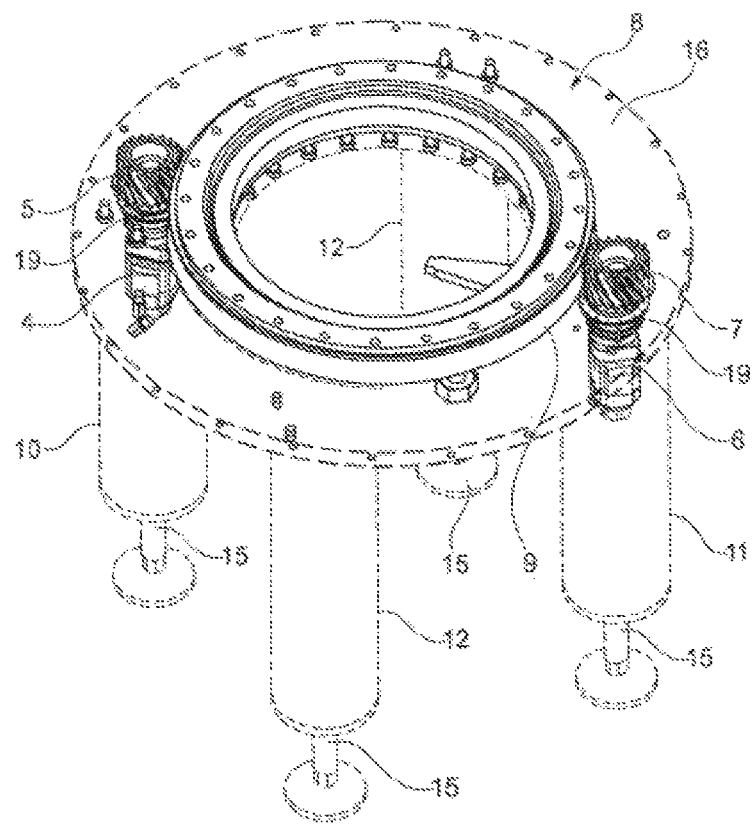
FIG. 3 is an oblique view of the container-treatment machine of FIG. 1 from above.

Between each pinion 5, 7 and its associated motor 4, 6 is a planetary gear 19, best seen in FIGS. 2 and 3. The planetary gear 19 permits the rotation of the motor 4, 6 to be adjusted to that required by the pinions 5, 7 for driving the ring gear 9.

FIG. 3 shows a view of the lower static part from above rather that from below as shown in FIG. 2. In this figure, one can clearly see the pinions 5, 7. The first and second motors 4, 6 are also shown, though they are in fact covered by the annular plate 16. The tooth arrangement of the ring gear 9 has been omitted for clarity.

As can be seen in FIG. 3, the first and second pinions 5, 7 are arranged on either side of a diameter of the ring gear 9. This means that the pinions 5, 7 are as far apart as it is possible to be.

Figure 4:
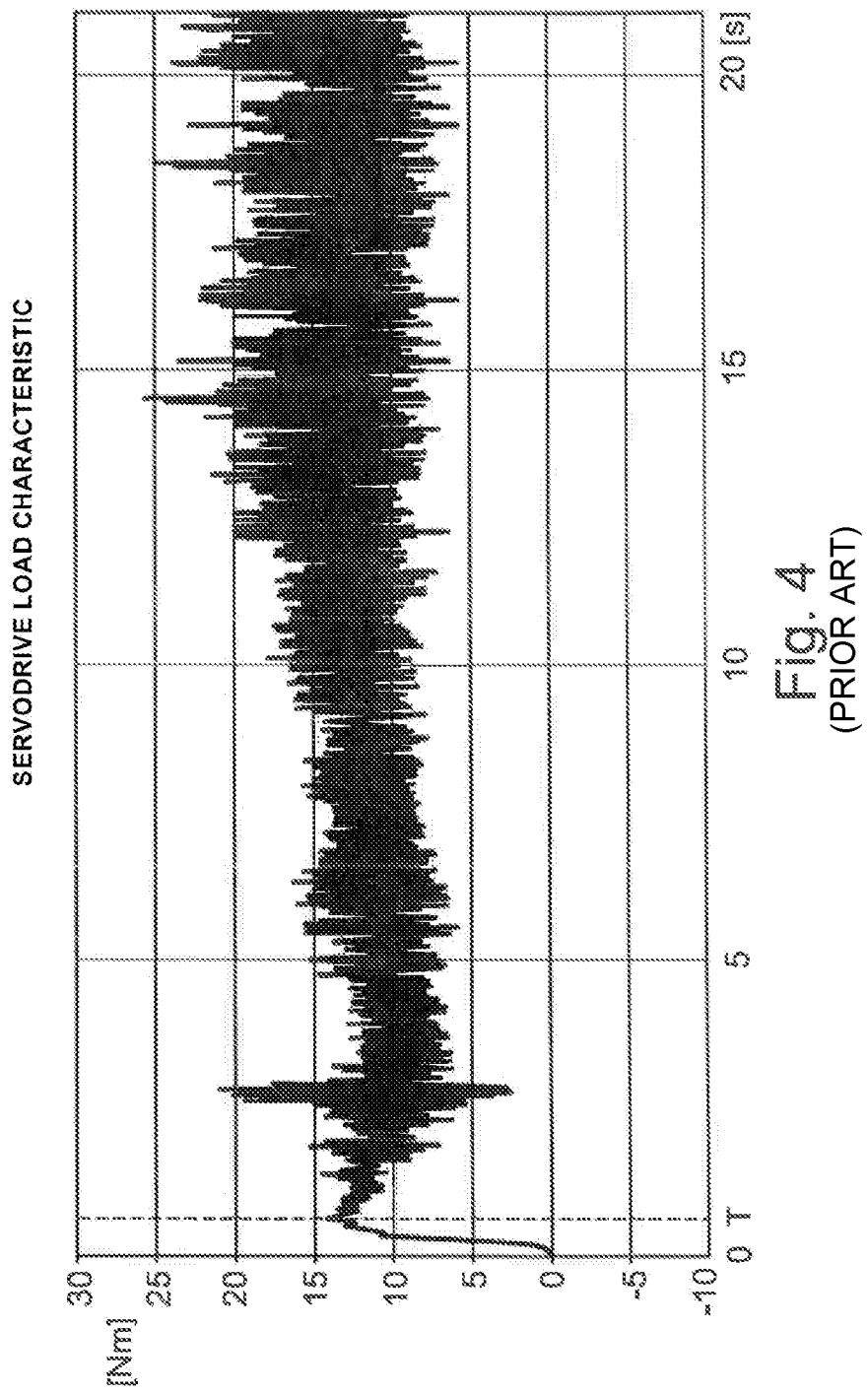
FIG. 4 shows a load characteristic of a single motor as used in the prior art.

FIG. 4 shows the load characteristic as a function of time for a prior art motor. The motor reaches its operating speed at time T, which is typically half a second after the motor starts. The torque then rises rapidly to about thirteen newton-meters. Upon reaching production speed, the motor is regulated to maintain that speed. This regulation results in a rapid fluctuations in torque over a wide range. As shown in FIG. 4, these fluctuations cause variations of about an order of magnitude, i.e., between about 2.5 newton-meters and 25 newton-meters.

The prior art motor is subjected to an average torque value of approximately fifteen newton-meters. However, because of the wide variation in instantaneous torque, it is necessary to provide a motor that is rated to accommodate the maximum value of torque. In addition, the motor is required to have enough intrinsic inertia to counteract the inertia of the rotating gyroscope. For a load curve as shown, it is typical to use a servomotor rated to approximately thirty-seven newton-meters.

For comparison, FIG. 5 shows first and second load characteristics 17, 18 corresponding to the first and second motors 4, 6 in FIGS. 1-3.

The motors 4, 6 begin operation at zero seconds. In the interval between zero seconds and T seconds, which is typically half a second, the motors operate in the same direction. As such, they supplement each other. Their torques rise rapidly to a value of about thirteen newton-meters. At the end of this interval, the motors 4, 6 will have reached production speed. Up to this point, the load curves are not so different from that in FIG. 4.

Upon reaching production speed, the second motor 6 switches from operating in drive mode to operating in generator mode. This is reflected in the second load curve 18, which suddenly drops to −6 newton-meters. The second motor 6 thus begins energy recovery.

Meanwhile, the first motor 4 continues to operate in drive mode. As a result, the first load characteristic 17 fluctuates only slightly. In the illustrated embodiment, the first motor's load remains between about ten newton-meters and fourteen newton-meters. Both motors 4, 6 avoid the significant fluctuations shown in the load curve of FIG. 4.

During regulation, the first motor 4 is used only to accelerate the gyroscope 2 and the second motor 6 is used only to decelerate it. In effect, the first motor 4 becomes a driving motor and the second motor 6 becomes a braking motor. This results in each motor 4, 6 experiencing a relatively steady load without the large fluctuations shown in FIG. 4.

In an alternative embodiment, each pinion 5, 7 is assigned to its own ring gear 9. This permits the separate ring gears to be optimized for the function of the respective motors 4, 6 to which they are coupled.

In yet other embodiments, there exists a toothed belt that connects one of the pinion 5, 7 to its corresponding ring gear 9 to transmit torque between the pinion 5, 7 and the ring gear 9.

Having described the invention and a preferred embodiment thereof, what is claimed as new and secured by Letters Patent is:

1. An apparatus comprising a container-treatment machine for treating containers, said container treatment machine comprising a first motor, a second motor, a bearing device, a ring gear, a gyroscope, a first column, a second column, a first pinion, and a second pinion, wherein said first and second motors, after having been started, are configured to be operated in the same direction only until production speed has been attained, wherein said first motor, which is arranged in said first column, couples to said first pinion, wherein said second motor, which is arranged in said second column, couples to said second pinion, wherein said first and second motors are fixed relative to said bearing device, wherein said gyroscope, which rotates about a rotation axis, receives said containers, wherein said ring gear, which is mounted on said bearing device, includes a circular tooth arrangement that meshes with said first and second pinions, and wherein said first and second pinions are arranged at a distance from one another along a circumferential direction of said tooth arrangement.

2. The apparatus of claim 1, wherein said first and second motors are DC motors.

3. The apparatus of claim 1, wherein said motors comprise a drive motor and a brake motor and wherein said drive motor and said brake motor are different types of motors.

4. The apparatus of claim 1, wherein said first and second motors are asynchronous motors.

5. The apparatus of claim 1, wherein said motors comprise a drive motor and a brake motor, wherein said brake motor is a servomotor and said drive motor is a torque motor.

6. The apparatus of claim 1, wherein said first and second motors comprise a drive motor and a brake motor, wherein said drive motor is a DC motor and wherein said brake motor is a servomotor.

7. The apparatus of claim 1, wherein said circular tooth arrangement and said pinions connect via slewing bearing connections.

8. The apparatus of claim 1, further comprising a planetary gear, wherein said planetary gear is arranged between said first motor and said first pinion, wherein by rotation of said first motor is adjustable to that required by said first pinion for driving said ring gear.

9. The apparatus of claim 1, wherein said motors comprise a drive motor and a brake motor, wherein said brake motor is a servomotor and said drive motor is a synchronous motor.

10. The apparatus of claim 1, wherein said and second motors are torque motors.

11. The apparatus of claim 1, wherein said motors comprise a drive motor and a brake motor, wherein said brake motor is a servomotor and said drive motor is a servomotor.

12. The apparatus of claim 1, wherein said container-treatment machine comprises a static lower-part and a rotating upper-part, wherein said rotating upper-part includes said gyroscope, wherein said gyroscope carries containers to be treated, wherein said ring gear is arranged at a lower end of said gyroscope.

13. The apparatus of claim 1, wherein said container-treatment machine comprises a static lower-part and a rotating upper-part, wherein said rotating upper-part includes said gyroscope, wherein said gyroscope carries containers to be treated, wherein said ring gear is mounted at an upper end of said static-lower part, and wherein said bearing device includes a horizontally-extending annular plate having a central opening.

14. The apparatus of claim 1, wherein said bearing device includes a horizontally-extending annular plate having a central opening, wherein said pinions are above said annular plate, and wherein said motors connect to said bearing device beneath said annular plate.

15. The apparatus of claim 1, wherein said pinions are as far apart as it is possible for them to be along said circumferential direction of said tooth arrangement.

16. The apparatus of claim 1, wherein said pinions are spaced apart by 180° along said circumferential direction of said tooth arrangement.

17. The apparatus of claim 1, wherein said first motor is dedicated to braking and said second motor is dedicated to driving, thereby avoiding having a single motor that constantly sustains reversals of polarity, whereby excessive heat production and constant phase-change sequences are avoided during operation.

18. The apparatus of claim 1, wherein said container-treatment machine comprises a static lower-part and a rotating upper-part, wherein said rotating upper-part includes said gyroscope, wherein said ring gear is only at a lower end of said gyroscope.

19. A method for operating a container-treatment machine that comprises first and second motors, a bearing device, a ring gear, and a gyroscope that rotates about a rotation axis and receives containers, said first and second motors being arranged in corresponding first and second columns, coupling to corresponding first and second pinions and being fixed relative to said bearing device, wherein said ring gear, which is mounted on said bearing device, includes a circular tooth arrangement that meshes with said first and second pinions, and wherein said first and second pinions are arranged at a distance from one another along a circumferential direction of said tooth arrangement, said method comprising operating, after starting said first and second motors, operating said first and second motors in the same direction only until production speed has been attained.

20. The method of claim 19, further comprising transitioning into a regulating mode after said production speed has been attained and, while in regulating mode, using said first motor only for accelerating said gyroscope and using said second motor only for decelerating said gyroscope.

21. The method of claim 19, further comprising, after having reached said production speed, causing said second motor to operate as a generator.

22. The method of claim 19, further comprising, after production speed has been attained, causing said first motor and second motors to generate torques having opposite signs.

* * * * *